(12) United States Patent
Wang et al.

(10) Patent No.: US 8,260,111 B2
(45) Date of Patent: Sep. 4, 2012

(54) METHOD OF BUTTON ROUTING EDITING FOR STORAGE MEDIUM MENU

(75) Inventors: Cheng-Feng Wang, Taipei (TW); Jia-sheng Su, Taipei (TW); Sheng-Wen Bai, Taipei (TW)

(73) Assignee: Corel Corporation, Ottawa (CA)

( * ) Notice: Subject to any disclaimer, the term of this patent is extended or adjusted under 35 U.S.C. 154(b) by 1329 days.

(21) Appl. No.: 11/530,959

(22) Filed: Sep. 12, 2006

(65) Prior Publication Data

US 2007/0266317 A1 Nov. 15, 2007

(30) Foreign Application Priority Data

Apr. 28, 2006 (TW) .............................. 95115387 A (51) Int. Cl.
*H04N 9/80* (2006.01)
(52) U.S. Cl. ........................................ 386/241; 386/336
(58) Field of Classification Search .................. 386/200, 386/240, 244, 282, 332, 241, 336
See application file for complete search history.

(56) References Cited

U.S. PATENT DOCUMENTS 6,141,004 A * 10/2000 Jeong ............................ 715/723

* cited by examiner

*Primary Examiner* — Huy T Nguyen
(74) *Attorney, Agent, or Firm* — Patterson & Sheridan LLP (57) ABSTRACT

A method of button routing editing for a storage medium menu containing at least one button is provided. The method includes steps of (a) displaying a routing reminder on a button with an incorrect routing status; (b) selecting at least one button; (c) displaying a routing controller on the selected button, wherein the routing controller comprises a first control button, a second control button, a third control button and a fourth control button; and (d) selecting one of the above-mentioned control buttons, and then selecting a target button to set a routing direction target for the selected control button to the target button, wherein after the steps (b)-(d) are performed, if there exists any button with an incorrect routing status, the routing reminder is displayed thereon, and if there exists any button with a correct routing status, no routing reminder is displayed thereon.

26 Claims, 6 Drawing Sheets

METHOD OF BUTTON ROUTING EDITING FOR STORAGE MEDIUM MENU

FIELD OF THE INVENTION

The present invention relates to a method of editing for a storage medium menu, and more particularly to a method of button routing editing for a storage medium menu.

BACKGROUND OF THE INVENTION

The function of button routing editing for a DVD (digital video disc) menu is generally applied to a few high-level of DVD software, and the editing method can be divided into the following two types.

Figure 1:
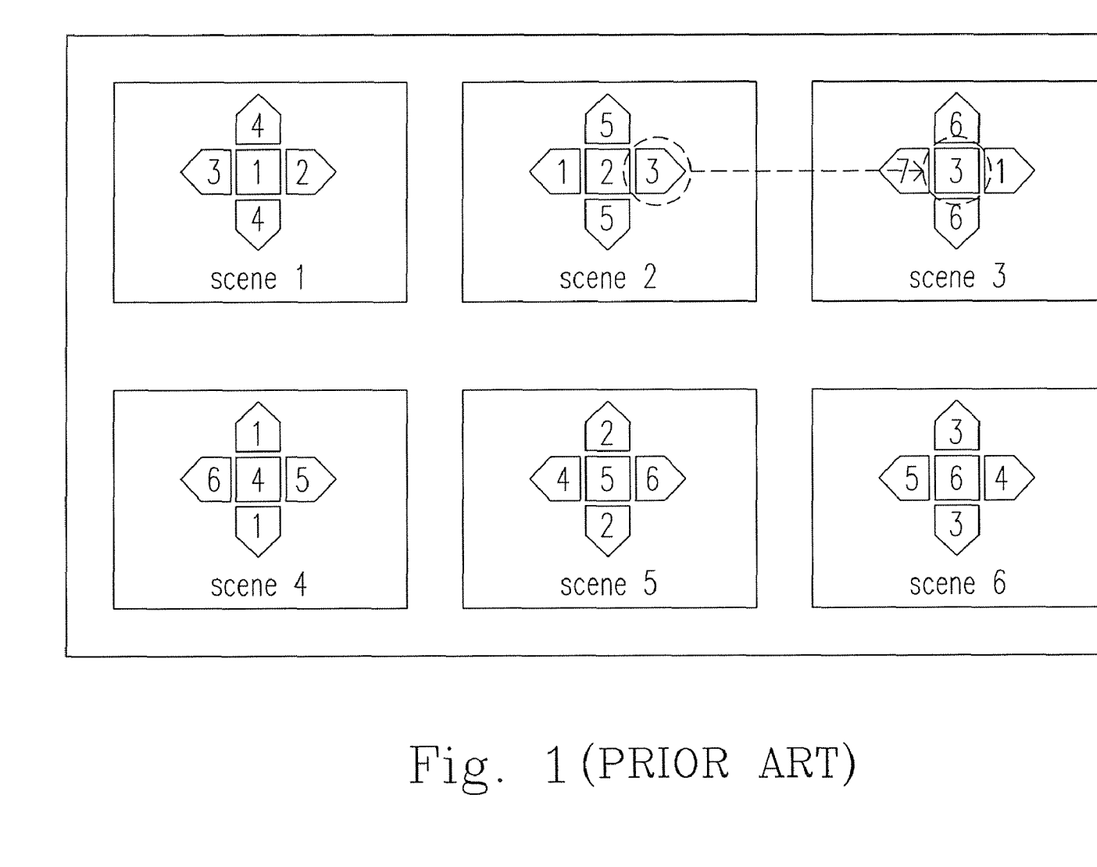
FIG. 1 is a schematic diagram showing the method of button routing editing for a DVD menu in the prior art.

Please refer to FIG. 1, which is a schematic diagram showing the method of button routing editing for a DVD menu in the prior art. The method is to assign numbers on each button for displaying four routing direction targets. The disadvantage for this method is the numbers of the four routing direction targets of each button are displayed on a screen simultaneously so that it is inconvenient for the user to identify the routing status of a certain button. Besides, the method can not present the button with an incorrect routing status. Furthermore, only one routing direction target for one button can be set at a time during the editing process.

Another method is to present the routing direction target for the selected button with a line or arrow. However, only one button can be selected at a time. Therefore, only one routing direction target for one button can be set at a time. Moreover, this method also can not present the button with an incorrect routing status.

In order to overcome the drawbacks in the prior art, an improved method of button routing editing for a storage medium menu is provided. The particular design in the present invention not only solves the problems described above, but also is easy to be implemented. Thus, the present invention has the utility for the industry.

SUMMARY OF THE INVENTION

In accordance with one aspect of the present invention, a method of button routing editing for a storage medium menu is provided. The method only presents the information that the user cares, including the routing direction target for the selected button and the button with an incorrect routing status. Besides, through the method, the respective routing direction targets for multiple buttons can be set to a specific button at a time.

In accordance with another aspect of the present invention, a method of button routing editing for a storage medium menu containing at least one button is provided. The method includes steps of (a) displaying a routing reminder on a button with an incorrect routing status; (b) selecting at least one button; (c) displaying a routing controller on the selected button, wherein the routing controller comprises a first control button, a second control button, a third control button and a fourth control button; and (d) selecting one of the first control button, the second control button, the third control button and the fourth control button, and then selecting a target button to set a routing direction target for the selected control button to the target button, wherein after the steps (b)-(d) are performed, if there exists any button with an incorrect routing status, the routing reminder is displayed thereon, and if there exists any button with a correct routing status, no routing reminder is displayed thereon.

In accordance with a further aspect of the present invention, a routing editing system for editing routings of buttons in a storage medium menu is provided. The routing editing system includes at least one routing reminder displayed on a button with an incorrect routing status; and at least one routing controller displayed on at least one button selected by a user, wherein the routing controller includes a first control button, a second control button, a third control button and a fourth control button. One of the control buttons is selected and a target button is selected for setting the routing direction target of the selected control button to the target button.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In the present invention, two components, the routing controller and the routing reminder, are used to display the routing status of a button. The routing controller is displayed on the button that user selects. Each routing controller includes four control buttons and their corresponding lines or arrows which are pointed to the corresponding routing direction targets. The routing reminder is displayed on the button with an incorrect routing status. The symbols and meanings of the routing reminder are illustrated as follows.

routing orphan symbol: This means a default button is unable to be linked to the button with the routing orphan symbol via any routing.

routing trap symbol: This means four routing directions for the button with the routing trap symbol are all pointed to itself. When other buttons are linked to the button with the routing trap symbol, they are unable to be linked out.

routing orphan and trap symbol: This means the symbol is a routing orphan and a routing trap.

Figure 2:
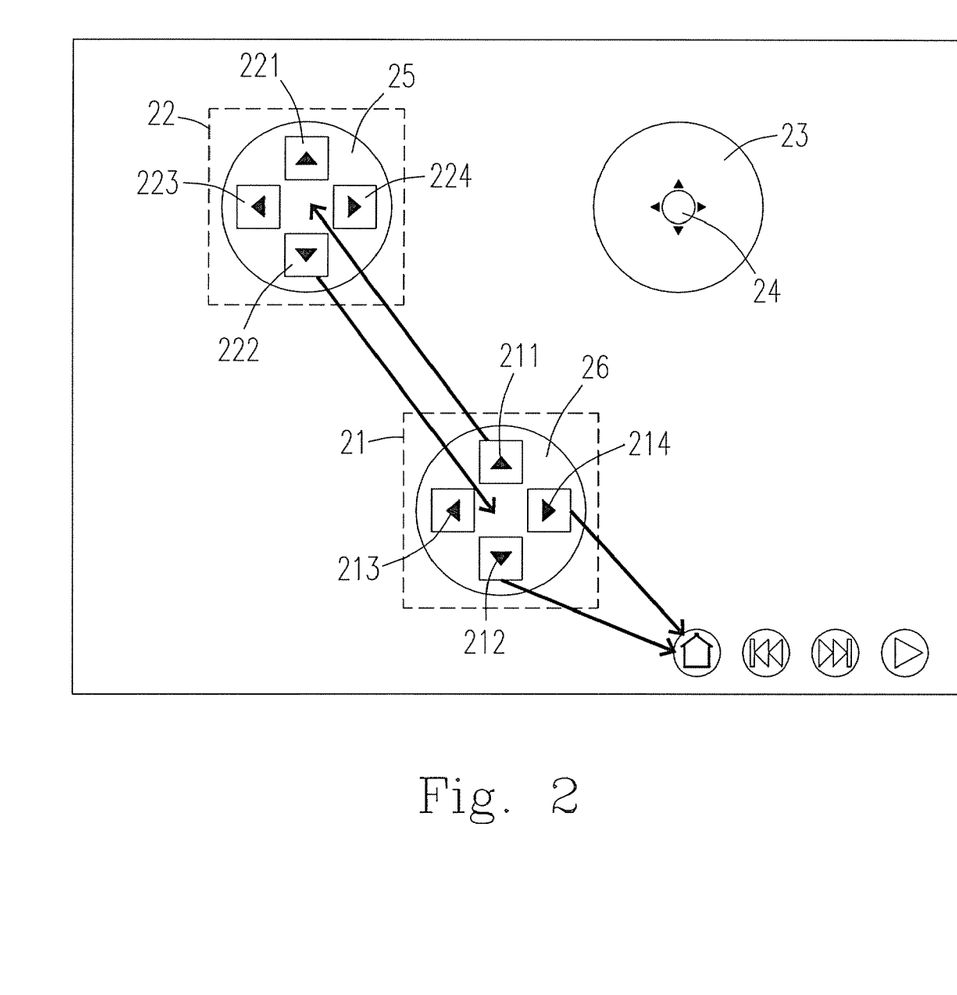
FIG. 2 is a schematic diagram showing the method of button routing editing for a DVD menu according to a preferred embodiment of the present invention.

Please refer to FIG. 2, which is a schematic diagram showing the method of button routing editing for a DVD menu according to a preferred embodiment of the present invention. As shown in FIG. 2, the DVD menu includes three buttons 23, 25, 26. The routing statuses of the buttons 25, 26 are displayed by two routing controllers 21, 22 respectively, wherein the black solid arrows are pointed to their corresponding routing direction targets.

The routing controller 21 includes a control button in an up direction 211, a control button in a down direction 212, a control button in a left direction 213 and a control button in a right direction 214. The routing controller 22 includes a control button in an up direction 221, a control button in a down direction 222, a control button in a left direction 223 and a control button in a right direction 224. A routing orphan symbol 24 is displayed on the button 23, which means the default button is unable to be linked thereto via any routing.

The present invention provides the following two operating methods to edit the button routing:

1. When the control button in a certain direction of the routing controller is clicked with a cursor and then a specific target button is clicked, the routing direction target for the control button will be set to the specific target button. If a plurality of buttons are selected during the operation, and the control button in the certain direction of one of the selected buttons is selected and then the specific target button is clicked, the respective routing direction targets for the control buttons in the certain direction of all selected buttons will be set to the specific target button.

2. When the control button in a certain direction of the routing controller is clicked with a cursor and then dragged to a specific target button, the routing direction target for the control button will be set to the specific target button. If a plurality of buttons are selected during the operation, and the control button in the certain direction of one of the selected buttons is selected and then dragged to the specific target button, the respective routing direction targets for the control buttons in the certain direction of all selected buttons will be set to the specific target button.

Figure 3A:
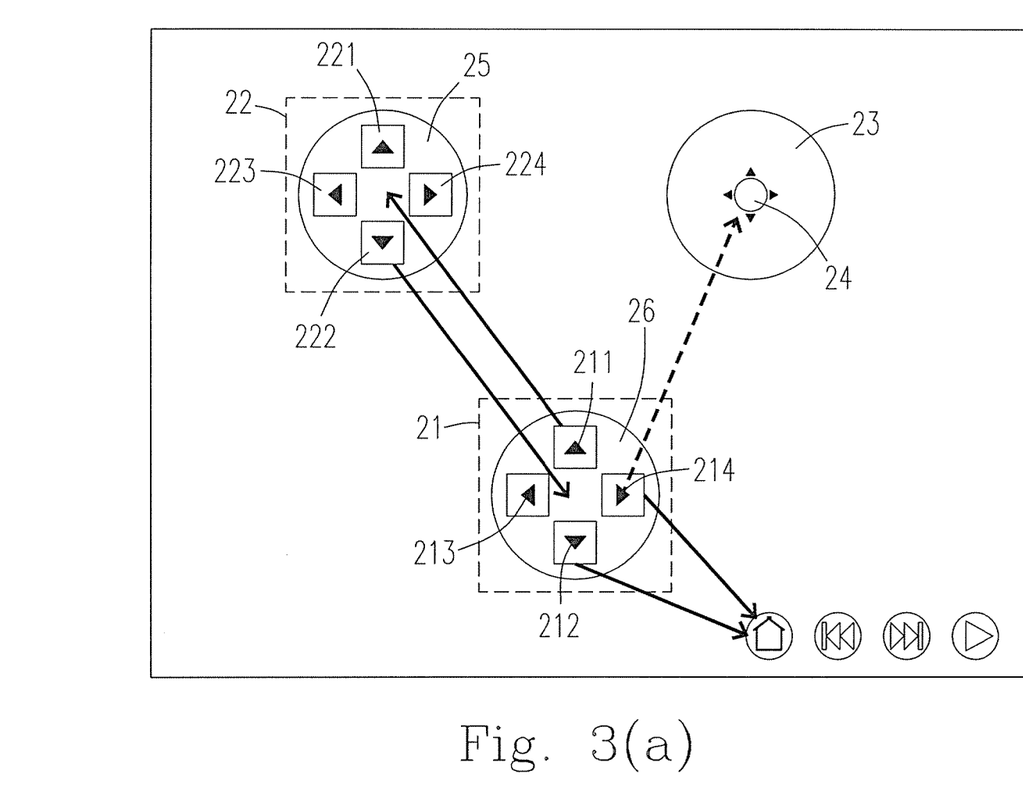
FIGS. 3(a)-3(b) are schematic diagrams showing the method of button routing setting according to a preferred embodiment of the present invention.
Figure 3B:
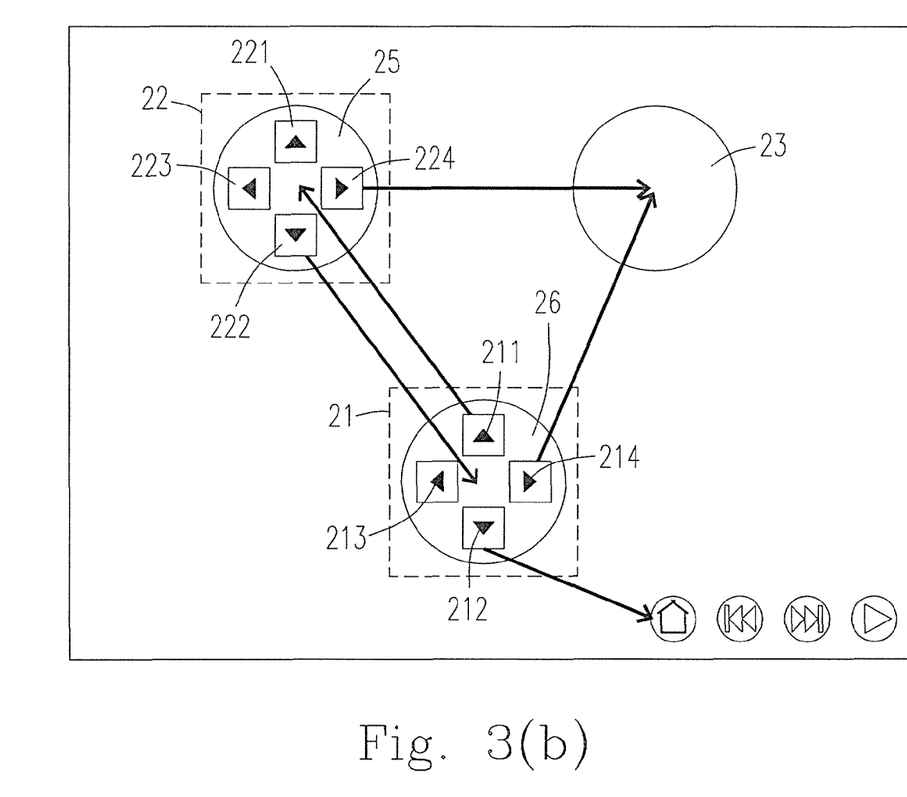

Please refer to FIGS. 3(a)-3(b), which are schematic diagrams showing the method of button routing setting according to a preferred embodiment of the present invention. As shown in FIGS. 3(a)-3(b), the routing orphan symbol 24 is displayed on the button with an incorrect routing status 23. The routing controller 22 displays the routing status of the button 25, wherein the respective routing direction targets for the control button in the up direction 221, the control button in the left direction 223 and the control button in the right direction 224 are not set, and the routing direction target for the control button in the down direction is set to the button 26. The routing controller 21 displays the routing status of the button 26, wherein the control button in the up direction 211 is set to the button 25, the routing direction target for the control button in the left direction 213 is not set, and the respective routing direction targets for the control button in the down direction 212 and the control button in the right direction 214 are set to the headpage. If the user wants to set the routing direction target for the control button in the right direction 214 of the button 26 to the button 23, he has to select the button 26 first for displaying the routing controller 21 thereon. Next, the user clicks the control button in the right direction 214 with a cursor and then clicks the button 23 or drags the control button in the right direction 214 to the button 23. At this time, the routing direction target for the control button in the right direction 214 of the button 26 will be set to the button 23, and an arrow is generated on the routing controller 21 which is pointed from the control button in the right direction 214 to the button 23. Preferably, the arrow can also be replaced with a line.

The routing direction targets for the control buttons 224, 214 in the right direction of the buttons 25, 26 are set to the button 23 at the same time and the routing controllers 21, 22 generate two arrows respectively that are pointed from the control buttons 214, 224 to the button 23 when the buttons 25, 26 are selected simultaneously, the control button in the right direction 214 of the button 26 is clicked with the cursor (or the control button in the right direction 224 of the button 25 is clicked with the cursor), and the button 23 is clicked. Preferably, the arrows can also be replaced with lines.

Otherwise, when the buttons 25, 26 are selected simultaneously, the control button in the right direction 214 of the button 26 is clicked with the cursor (or the control button in the right direction 224 of the button 25 is clicked with the cursor), and the control button in the right direction 214 of the button 26 is dragged to the button 23 (or the control button in the right direction 224 of the button 25 is dragged to the button 23), the routing direction targets for the control buttons 224, 214 in the right direction of the buttons 25, 26 are also set to the button 23 simultaneously.

Besides, as shown in FIG. 3(b), the routing orphan symbol 24 originally displayed on the button 23 will disappear since the respective routing direction targets for the control buttons 214, 224 have been set thereto to make it a button with a correct routing status. Moreover, if the button 25 or 26 is originally a button with an incorrect routing status but has become a button with a correct routing status after the setting procedure, the routing reminder originally displayed thereon will disappear.

The present invention provides the following three operating methods to cancel the routing direction target for the control button:

1. When the control button in a certain direction of the routing controller is clicked with a cursor and then the background area of the DVD menu is clicked, the routing direction target for the control button will be cancelled. If a plurality of buttons are selected during the operation, and a control button in a certain direction of one of the selected buttons is selected and then the background area of the DVD menu is clicked, the respective routing direction targets for the control buttons in the certain direction of the selected buttons will all be cancelled.

2. When the control button in a certain direction of the routing controller is clicked with a cursor and then dragged to the background area of the DVD menu, the routing direction target for the control button will be cancelled. If a plurality of buttons are selected during the operation, and a control button in a certain direction of one of the selected buttons is selected and then dragged to the background area of the DVD menu, the respective routing direction targets for the control buttons in the certain direction of the selected buttons will all be cancelled.

3. When the control button in a certain direction of the routing controller is clicked with a cursor and then double clicked, the routing direction target for the control button will be cancelled. If a plurality of buttons are selected during the operation, and a control button in a certain direction of one of the selected buttons is selected and then double clicked, the respective routing direction targets for the control buttons in the certain direction of the selected buttons will all be cancelled.

Figure 4A:
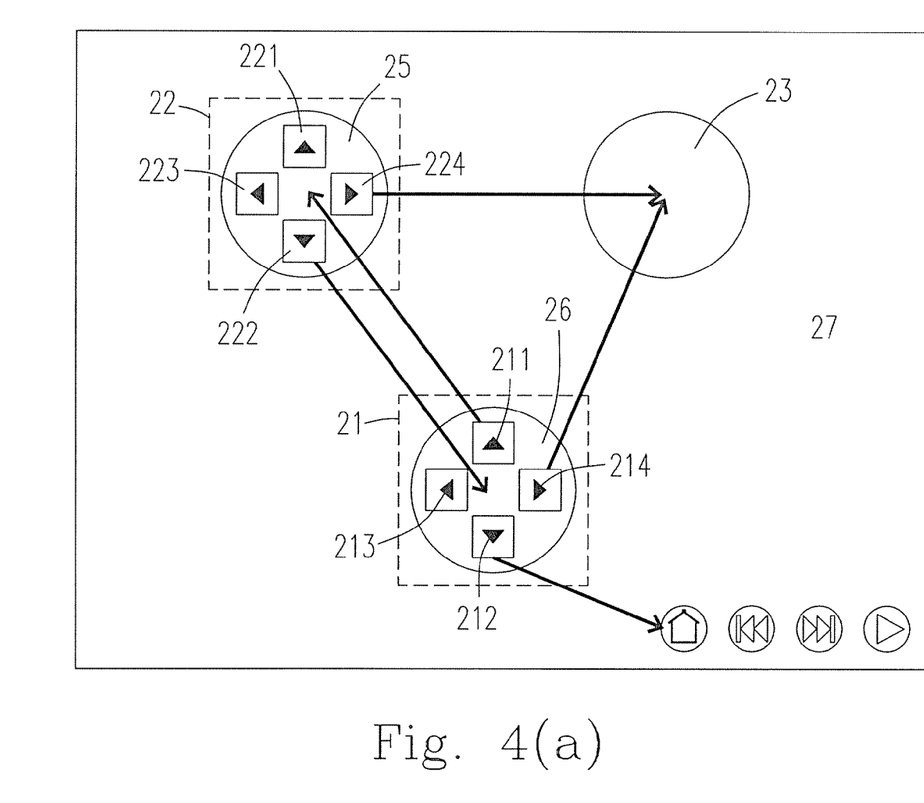
FIGS. 4(a)-4(b) are schematic diagrams showing the method of button routing canceling according to a preferred embodiment of the present invention.
Figure 4B:
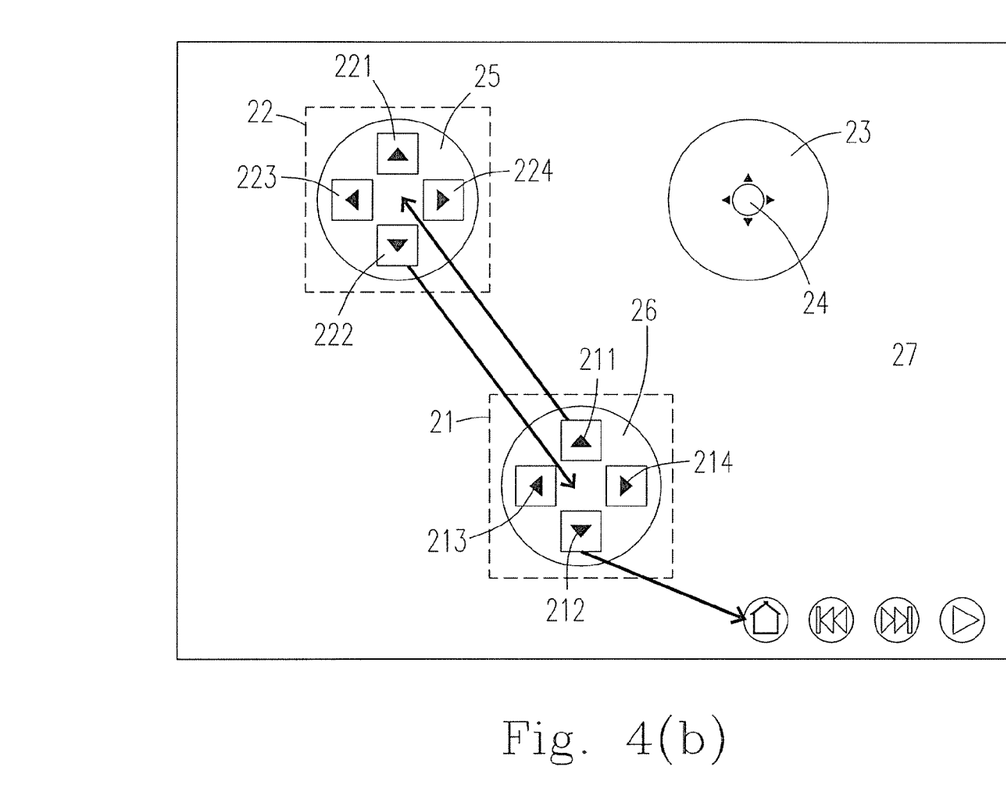

Please refer to FIGS. 4(a)-4(b), which are schematic diagrams showing the method of button routing canceling according to a preferred embodiment of the present invention. As shown in FIGS. 4(a)-4(b), the user may select the control button in the right direction 224 first, and then click the background area 27 of the DVD menu with the cursor or drag the control button in the right direction 224 to the background area 27. In this way, the routing direction target for the control button in the right direction 224 of the button 25 will be cancelled. Furthermore, the user may select the buttons 25, 26 simultaneously, and click the control button in the right direction 224 of the routing controller 22 with the cursor (or click the control button in the right direction 214 of the routing controller 21 with the cursor), and then click the background area 27 of the DVD menu with the cursor or drag the control button in the right direction 224 to the background area 27. In this way, the respective routing direction targets for the control buttons in the right direction 224, 214 of the buttons 25, 26 will be cancelled.

Otherwise, the user may also select the buttons 25, 26 simultaneously and then double click the control button in the right direction 224 of the routing controller 22 with the cursor (or double click the control button in the right direction 214 of the routing controller 21 with the cursor). In this way, the respective routing direction targets for the control buttons in the right direction 224, 214 of the buttons 25, 26 will be cancelled.

At this time, as shown in FIG. 4(*b*), the routing orphan symbol 24 is displayed on the button 23 since the respective routing direction targets for the control buttons 214, 224 originally set thereto have been cancelled which makes it a button with an incorrect routing status. Moreover, if the button 25 or 26 is originally a button with a correct routing status but has become a button with an incorrect routing status after the canceling procedure, the routing reminder will be displayed thereon.

In conclusion, the present invention provides a method of button routing editing for a storage medium menu. The method only presents the information that the user cares, including the routing direction target for the selected button and the button with an incorrect routing status. Besides, through the method, the respective routing direction targets for multiple buttons can be set to a specific button at a time. Therefore, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of button routing editing for a menu containing a plurality of buttons, comprising steps of:
    (a) displaying, to a user, on a display one or more routing reminders generated by a processor, each routing reminder associated with one of the buttons on the menu determined by operation of the processor to have an incorrect routing status;
    (b) establishing, in response to the user interacting with a cursor controlled by a user input device, a user selection of at least one of the plurality of buttons on the menu;
    (c) displaying, on the display, a routing controller associated with the selected button, wherein the routing controller comprises a first control button, a second control button, a third control button and a fourth control button; and
    (d) establishing a user selection of at least one of the first control button, the second control button, the third control button, and the fourth control button, and establishing a user selection of a target button to set a routing direction target for the selected control button to the target button; and
    (e) determining, by operation of the processor, if there exists any button of the menu having an incorrect routing status, and in response:
        continuing to display the routing reminder on the menu if there exists any button with an incorrect routing status, and
        removing the display of the routing reminder if no button exists with an incorrect routing status.

2. The method as claimed in claim 1, wherein when a plurality of the buttons are selected, one of the first control button, the second control button, the third control button and the fourth control button for one of the selected buttons is selected first and then the target button is selected second, the respective routing direction targets for the selected control buttons of the selected buttons are set as being routed to the target button on the menu.

3. The method as claimed in claim 1, wherein establishing the user selection of at least one of the first control button, the second control button, the third control button, the fourth control button, and the target button comprises an action of the user with the user input device when the cursor is within a predetermined region of the target button.

4. The method as claimed in claim 1, wherein the step (d) is performed by establishing the selection of one of the first control button, the second control button, the third control button and the fourth control button by the user dragging the selected button, with the cursor, to the target button.

5. The method as claimed in claim 1, further comprising:
    (f) establishing, in response to the user selection of the selected control button, and then establishing a user selection of a background area of the menu cancels the routing direction target for the selected control button and causes the processor to determine if any button of the menu with an incorrect routing status exists wherein the routing reminder is displayed thereon or if any button with a correct routing status exists wherein no routing reminder is displayed thereon.

6. The method as claimed in claim 5, wherein the step (f) comprises:
    establishing a user selection of one of the first control button, the second control button, the third control button, the fourth control button, and establishing with the processor the selection of the background area comprises an action of the user with the user input device when the cursor is within a predetermined region of the menu.

7. The method as claimed in claim 5, wherein the step (f) is performed by establishing selection of the selected control button by the user and the user dragging the selected button with the cursor to the background area.

8. The method as claimed in claim 1, further comprising:
    (f) establishing with the processor by an action of the user with the user input device when the cursor is within a predetermined region comprising the selected control button to thereby cancel the routing direction target for the selected control button and causes the processor to determine if there any button of the menu with an incorrect routing status wherein the routing reminder is displayed thereon or if there exists any button with a correct routing status wherein no routing reminder is displayed thereon.

9. The method as claimed in claim 1, wherein the routing reminder is a routing orphan symbol, indicating a default button is unable to be linked to the button with the routing orphan symbol via any routing of the menu.

10. The method as claimed in claim 1, wherein the routing reminder is a routing trap symbol, indicating four routing directions for the button, with the routing trap symbol are all pointed to itself.

11. The method as claimed in claim 1, wherein the routing reminder is a routing orphan and trap symbol.

12. The method as claimed in claim 1, wherein the first control button, the second control button, the third control button and the fourth control button respectively represent an up routing direction, a down routing direction, a left routing direction and a right routing direction.

13. The method as claimed in claim 12, wherein the routing controller further comprises at least one indicative symbol pointed to a specific routing direction target.

14. The method as claimed in claim 13, wherein the indicative symbol is a line.

15. The method as claimed in claim 13, wherein the indicative symbol is an arrow.

16. The method as claimed in claim 1, wherein the menu relates to audiovisual storage media.

17. A routing editing system for editing routings of buttons in a menu, comprising:
    a display in electrical communication with a processor, wherein the processor is executing a computer program retrieved from a non-transitory tangible computer readable medium, the computer program executing a computer process, the computer process comprising:
    providing at least one routing reminder displayed on a display to a user generated by the processor in associated with a button on a menu having an incorrect routing status; and
    providing at least one routing controller displayed on the display generated by the processor, the routing controller comprising at least one button selectable by the user by establishing an association with a cursor displayed to the user by the processor and controlled by the user with a user input device, wherein the routing controller comprises a first control button, a second control button, a third control button and a fourth control button, wherein when one of the control buttons is established by the processor as being selected in response to the user interacting with the user input device and then a target button is established by the processor as being selected in response to the user interacting with the user input device, the routing direction target for the selected control button is set to the target button.

18. The routing editing system as claimed in claim 17, wherein when a plurality of buttons are selected, at least one of the first control button, the second control button, the third control button and the fourth control button for one of the selected buttons is established by the processor as being selected first and then the target button is established by the processor as being selected second, the respective routing direction targets for the selected control buttons of the selected buttons are set by the processor to the target button.

19. The routing editing system as claimed in claim 17, wherein the routing reminder is a routing orphan symbol, indicating a default button is unable to be linked to the button with the routing orphan symbol via any routing.

20. The routing editing system as claimed in claim 17, wherein the reminder is a routing trap symbol, indicating four routing directions for the button with the routing trap symbol are all pointed to itself.

21. The routing editing system as claimed in claim 17, wherein the routing reminder is a routing orphan and trap symbol.

22. The routing editing system as claimed in claim 17, wherein the first control button, the second control button, the third control button and the fourth control button respectively represent an up routing direction, a down routing direction, a left routing direction and a right routing direction.

23. The routing editing system as claimed in claim 22, wherein the routing controller further comprises at least one indicative symbol pointed to a specific routing direction target.

24. The routing editing system as claimed in claim 23, wherein the indicative symbol is a line.

25. The routing editing system as claimed in claim 23, wherein the indicative symbol is an arrow.

26. The routing editing system as claimed in claim 17, wherein the menu relates to audiovisual storage media.

* * * * *